US006910701B1

(12) United States Patent
Long et al.

(10) Patent No.: US 6,910,701 B1
(45) Date of Patent: Jun. 28, 2005

(54) WHEELCHAIR PROPULSIVE MECHANISM

(76) Inventors: Thomas Long, 466 Legion St., Morgantown, WV (US) 26505; Wayne Scott, 864 Independence Hill, Morgantown, WV (US) 26505; Alfred Stiller, 443 Jefferson St., Morgantown, WV (US) 26501

( * ) Notice: Subject to any disclaimer, the term of this patent is extended or adjusted under 35 U.S.C. 154(b) by 20 days.

(21) Appl. No.: 10/607,867

(22) Filed: Jun. 27, 2003

Related U.S. Application Data

(60) Provisional application No. 60/394,785, filed on Jul. 10, 2002.

(51) Int. Cl.$^{7}$ .............................................. B62M 1/14
(52) U.S. Cl. .................................... 280/250; 280/250.1
(58) Field of Search ................................ 280/247, 248, 280/249, 242.1, 250, 250.1

(56) References Cited

U.S. PATENT DOCUMENTS

| | | | | | |
|---|---|---|---|---|---|
| 432,381 | A | * | 7/1890 | Haas | 280/208 |
| 946,842 | A | * | 1/1910 | Dillon | 280/211 |
| 4,274,650 | A | * | 6/1981 | Gilles | 280/250.1 |
| 4,560,181 | A | | 12/1985 | Herron | |
| 4,758,013 | A | | 7/1988 | Agrillo | |
| 5,037,120 | A | * | 8/1991 | Parisi | 280/250.1 |
| 5,499,833 | A | * | 3/1996 | Her et al. | 280/247 |
| 6,047,980 | A | * | 4/2000 | Margherita et al. | 280/250.1 |
| 6,257,608 | B1 | | 7/2001 | Hanson | |
| 6,409,195 | B1 | | 6/2002 | Adams | |

* cited by examiner

*Primary Examiner*—Kevin Hurley
(74) *Attorney, Agent, or Firm*—Sven W. Hanson

(57) ABSTRACT

A wheelchair propulsion system provides a wheelchair user with a continuous input drive path of linear or elliptical shape. The propulsion system includes a Cardan gear system defining a linear reciprocating or elliptical input path over which propulsive force may be continuously applied to the wheelchair wheels. Because the input path is continuous, efficiency is increased and impact on the user's body is reduced thereby reducing discomfort and physical demands on the user's body. The angle of the input path may be altered to suit the particular needs of a user by rearrangement of the relative angular orientations of the gears in the propulsive system. The present propulsive mechanism may be integrated into a wheelchair or retrofitted to existing wheelchairs.

5 Claims, 5 Drawing Sheets

WHEELCHAIR PROPULSIVE MECHANISM

RELATED DOCUMENTS

Priority is claimed from the U.S. provisional patent application filed Jul. 10, 2002 and having application Ser. No. 60/394,785.

BACKGROUND OF THE INVENTION

The present invention pertains to wheelchairs for human travel and methods of manual propulsion of such wheelchairs. In particular, the present invention is a propulsive device and wheelchair including a mechanism with a continuous reciprocating linear or elliptical input path.

A large number and portion of the population in the U.S. use wheelchairs to cope with mobility impairments. The limitations imposed on these persons as a result of their reliance on wheelchairs significantly reduces their quality of life. In addition, many wheelchair users experience musculoskeletal injuries of the shoulder, elbow and wrist. These injuries are caused by the high force exertions, repetitive motions and awkward postures inherent in use of standard wheelchairs. In addition, the basic propulsive mode with a conventional wheelchair is one of asymmetric muscle use (push mode) leading to unbalanced muscle development. These problems may be complicated by limited upper extremity dexterity of those wheelchair users having spinal cord injuries. Fifty to 70 percent of wheelchair users experience some sort of shoulder pain, rotator tear, or impingement problem that can permanently hinder mobility and increase medical costs. The incidence of carpal tunnel syndrome among wheelchair users has been reported to be as high as 63 percent and research indicates that this may be a result of nerve compression from forceful exertions of the hand and wrist during wheelchair operation. Repetitive strikes of the heel of the hand against the wheel rim of conventional wheelchairs may cause pain and numbness of the thumb and fingers. The interaction of the user's body and their wheelchair is a direct consequence of the basic design of the conventional wheelchair and the associated necessary mode of propulsion.

The design of the typical manual wheelchair has endured, largely unchanged, due to its simplicity. Relatively recently, advances to wheelchair design have addressed the need for improved propulsive mechanisms. Various wheel cranks, geared hubs and the like have been proposed in the prior art to reduce the necessary force for propulsion. However, these prior art devices do not effectively allow for altering the user's posture nor modify the basic propulsive motion itself the primary factors contributing to injury. What is needed is a mechanism for propelling a wheelchair which allows for increased use of large muscle groups in symmetric operation, improved posture and reduced contact pressure to the user.

SUMMARY OF THE INVENTION

The present invention is a novel wheelchair propulsion system and a wheelchair incorporating the propulsion system. The propulsion system provides a human user with a continuous reciprocating input drive path in operation of which the user's hands may remain on an input handle. The propulsion system includes a gear system defining a linear reciprocating or elliptical input path for the user's handle. Because the input path is continuous, efficiency is increased and impact on the user's body is reduced thereby reducing discomfort and physical demands on the user's body. The angle of the input path may be altered in any embodiment to suit the particular needs of a user by rearrangement of the relative angular orientations of the gears in the propulsive system.

In a preferred embodiment, a propulsive system is mounted on both sides of a wheelchair body. Each propulsive system is connected to a respective weight-bearing wheel of the wheelchair through gears and chains. In operation, each propulsive system may be driven, independently or in concert, in forward or backward directions to propel or turn the wheelchair in any direction. Because the propulsive system is directly connected to the wheels of the wheelchair, the propulsive system may also be used to slow or stop the wheelchair by resisting the movement of an input handle. In the preferred embodiment, the gears of the propulsive system are linked by roller chains.

In alternative embodiments, a single propulsive system is incorporated on one side of a wheelchair body and is linked to drive wheels on both sides of the wheelchair.

One benefit of the present invention is the ability to retrofit a propulsive mechanism according to the invention to many standard wheelchairs. Due to the simplicity of the propulsive system and wheelchairs using the propulsive system, the invention provides a relatively low cost alternative to conventional modes of wheelchair operation. Other characteristics and advantages of this invention will become apparent from the following drawings, detailed descriptions, and claims.

DESCRIPTION OF THE PREFERRED EMBODIMENTS

Figure 1:
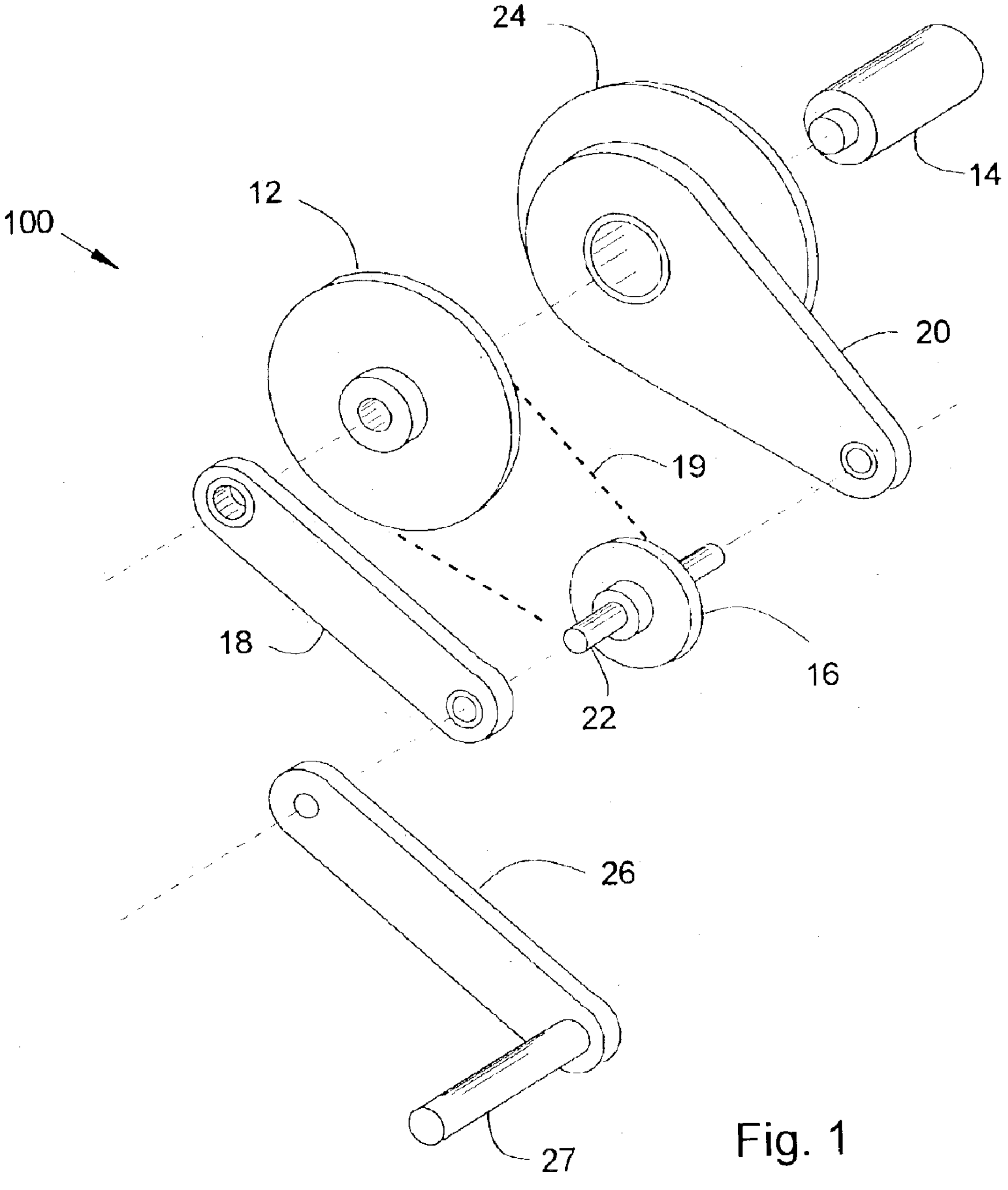
FIG. 1 is an exploded perspective view of one embodiment of a wheelchair propulsion system according to the present invention.
Figure 2:
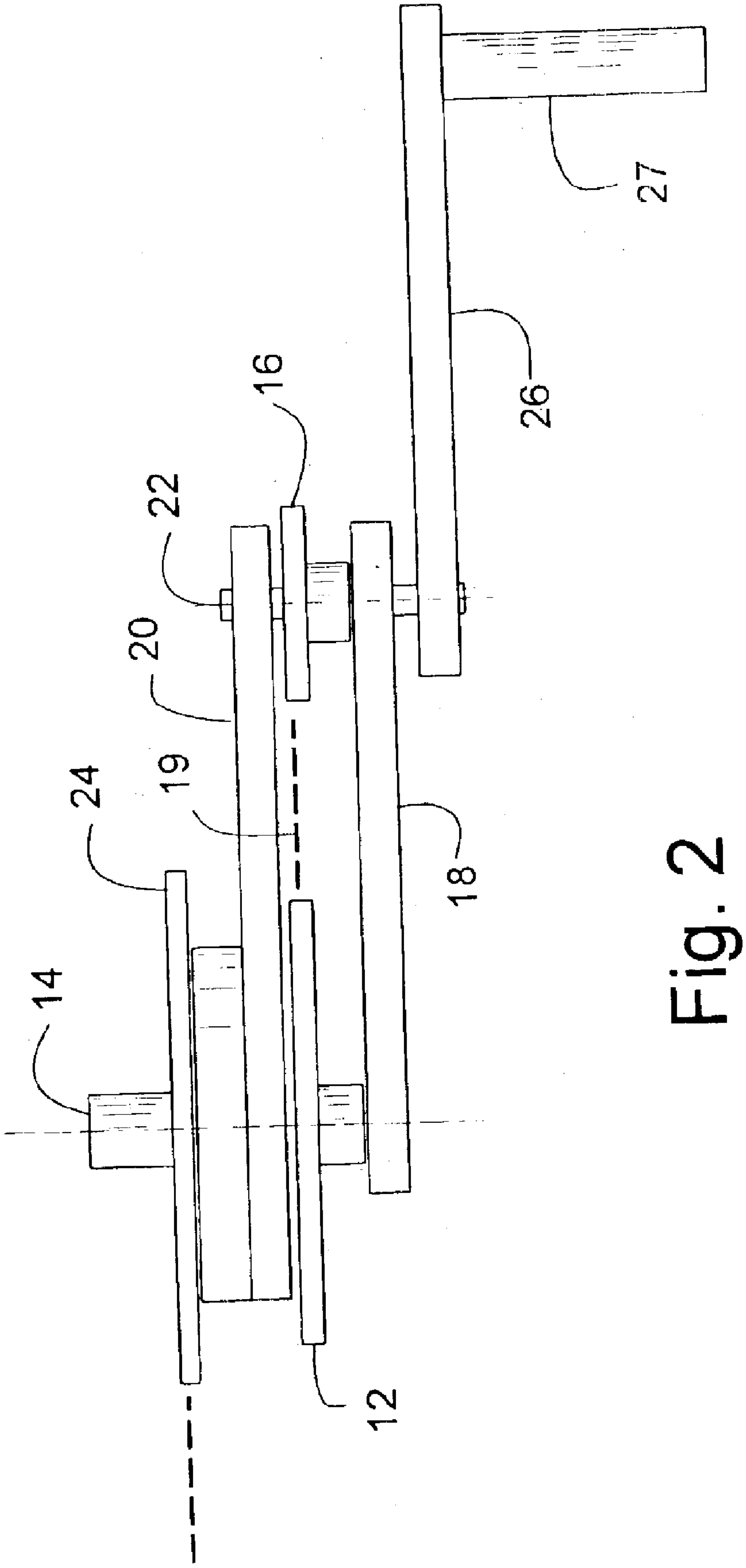
FIG. 2 is a top view of the assembled elements of the embodiment of FIG. 1.

FIG. 1 is an exploded perspective view of one embodiment of a wheelchair propulsion system 100 according to the present invention. FIG. 2 is a top view of the assembled elements of the same embodiment. The propulsion system 100 is based on a Cardan type gear arrangement. A sun gear 12 is rigidly secured to a main shaft 14 such that the sun gear 12 does not rotate. A planet gear 16 is held coplanar with the sun gear by an orbit lever 18 and a back connecting lever 20. The orbit lever 18 is rigid and is connected through needle bearings to the end of the main shaft 14. At the opposite end, the orbit lever 18 supports, also through needle bearings, a planet gear shaft 22. The planet gear shaft 22 is parallel to the main shaft and may be either rigidly secured through the center axis of the planet gear 16, or in similar configurations, may be integral to the planet gear body. The back connecting lever 20 is rigid and rotates freely on bearings on the main shaft 14. The outward end of the back connecting lever 20 supports the planet gear shaft 22 in needle bearings, opposite the orbit lever 18. The back connecting lever 20 is rigidly connected to a drive gear 24 which is centered on the main shaft centerline. In this arrangement, the planet gear 16 freely rotates about its center axis and about the sun gear 12 and main shaft centerline. The planet gear 16 may be supported, alternatively, solely by the back connecting lever in a cantilevered configuration without an orbit lever. However, such a configuration is less rigid and has less strength than the design shown in the figures.

To provide the desired propulsive functions, the planet gear 16 is rotationally connected to the sun gear 12 through a roller chain 19 (shown schematically). For simplicity, the details of the teeth of the gears in the figures are not shown. Construction of the needed gears or chain sprockets will be known to those skilled in the art from the functional requirements provide herein. To provide the desired drive path, the effective size ratio of the sun gear 12 to planet gear 16 must be 2:1 (two to one), respecting the effective pitch diameter or other like functional size characteristic. A rigid input lever 26 is rigidly secured to the end of the planet gear shaft 22. The input lever 26 includes a perpendicular grippable handle 27 that preferably is rotatably mounted on the input lever 26.

In operation, the handle 27 is used to forcibly move the planet gear 16 which consequently is driven about the sun gear 12. The orbit lever 18, back connecting lever 20 and drive gear 24 in turn rotate to follow the movement of the planet gear 16 about the main shaft 14. The input motion of the handle 27 to continue this motion of these elements is, in part, determined by the relative lengths of the orbit lever 18 and input lever 26. If the length of both levers, from bearing the centerline to opposing end bearing centerline, is the same, the input motion of the handle will be reciprocating on a straight line defined by the line through the longitudinal center axis of both levers when mutually parallel. If the input handle 26 is shorter, the handle motion path will be an ellipse with a major axis through the longitudinal center axis of both levers when parallel. Herein the term “reciprocating”, with respect to the handle input path, is meant to indicate both an alternating forward and backward motion on a linear path and also continuous motion on an elliptical path as motion parallel to the ellipse major axis is effectively reciprocating for the purposes here.

Figure 3A:
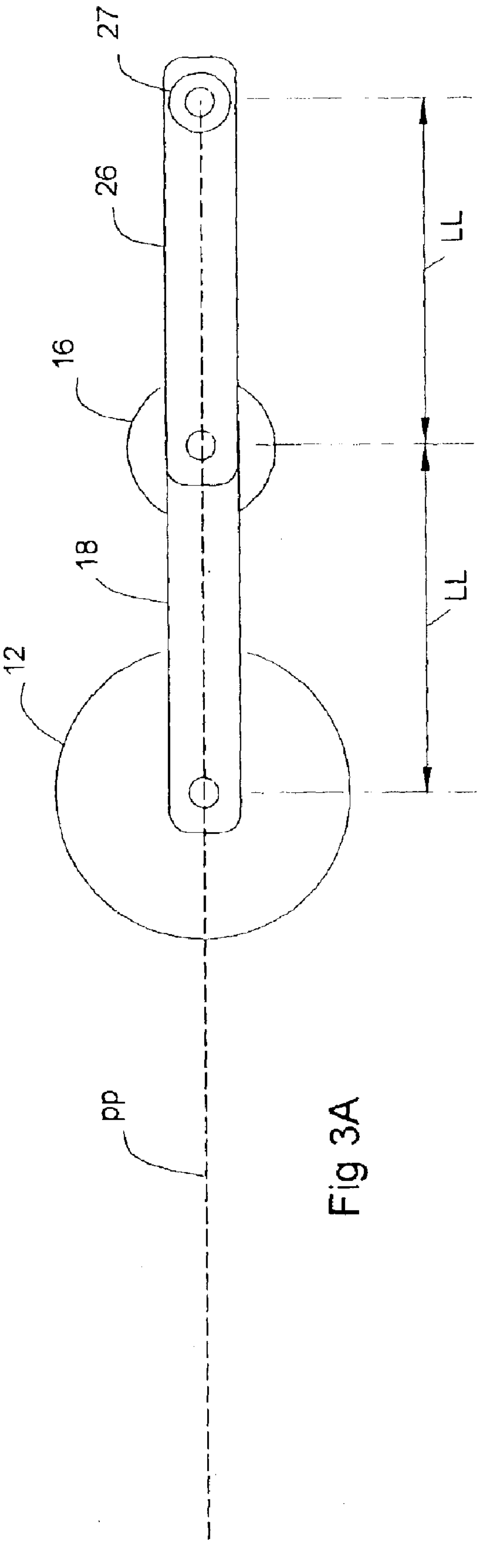
FIGS. 3A and 3B depict two different alternative drive input paths of various embodiments of the inventive propulsive mechanism.
Figure 3B:
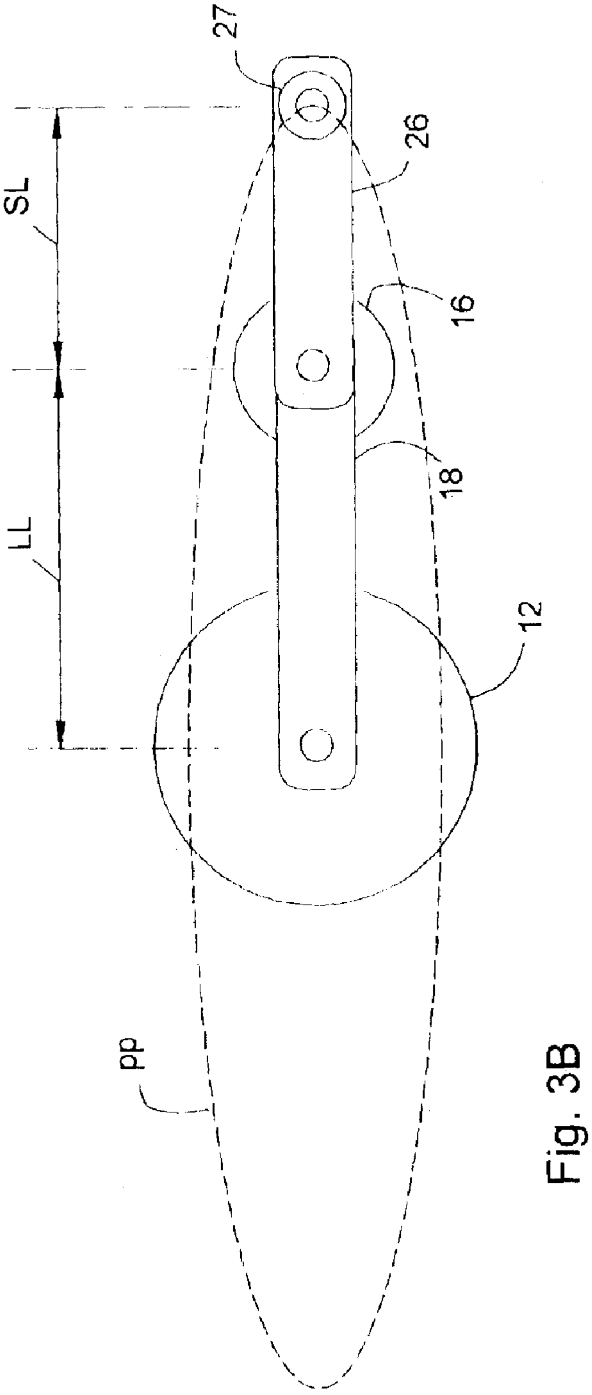

FIGS. 3A and 3B depict two different constructions of the inventive propulsive mechanism providing for linear and elliptical input motion, respectively. For simplicity of illustration and discussion, only the sun and planet gears and attached levers are shown. In FIG. 3A, the orbit lever 18 and the input lever 26 have equal lengths LL. The resulting input path PP of the handle 27 is a straight line passing through the longitudinal centerline of both levers. In FIG. 3B, the input lever is relatively shortened to a reduced input lever length SL less than LL. The resulting elliptical path of the handle 27 is shown.

Figure 4:
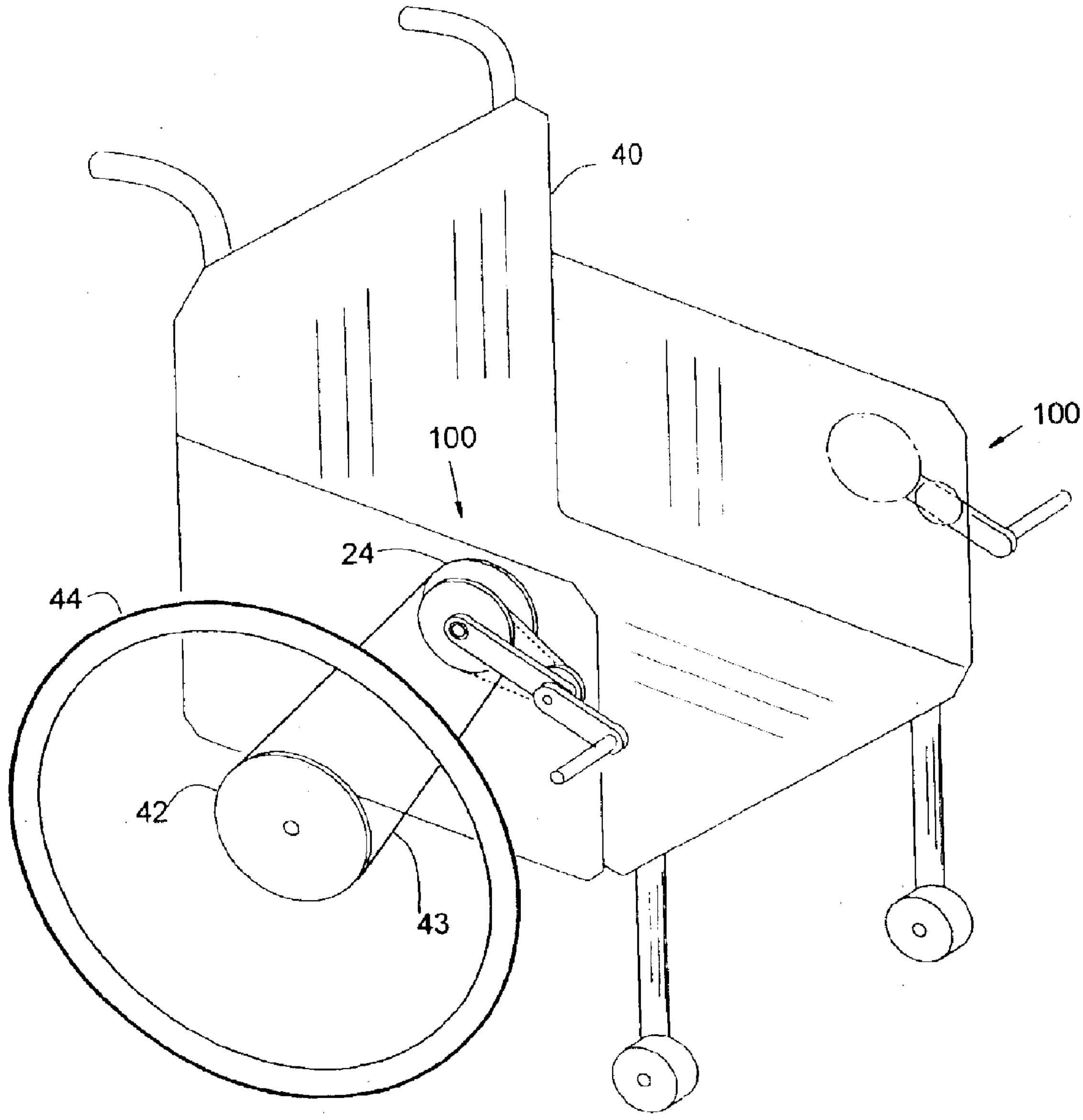
FIG. 4 is a perspective view of a wheelchair according to the present invention including the novel propulsive mechanism.

FIG. 4 depicts a wheelchair 40 having a typical wheelchair body including a propulsion mechanism 100 as described above. The propulsion mechanism 100 is mounted to the side of the wheelchair body in a location easily operated by a seated user. The propulsion mechanism drive gear 24 is connected to a wheel sprocket gear 42 by a drive chain 43. The wheel sprocket gear 42 is rigidly attached directly to the chair wheel 44 or to a wheel axle (not shown) to directly impart drive force to the wheel 44 (wheel spokes not shown). A second similar propulsion mechanism and associated wheel sprocket gear are provided on the opposing side of the wheelchair to function in a like manner to drive the opposing wheel. In the configuration shown, propulsion is directed to the main supporting wheels of the wheelchair. However, in alternative embodiments the propulsion force may be likewise directed to any wheels bearing on the supporting traveled surface. In further embodiments, the same propulsion mechanism may be attached to, or integrated into, other wheeled chairs. For example in one alternative, a single propulsion mechanism as described herein is attached to one side of a wheelchair and linked to a single cross-axle to drive both wheels. Use of the present propulsion mechanism may be combined with other prior propulsion and braking systems. Note that the configuration shown in the figures is “direct drive”. That is, the motion of the input handle 27 directly and continuously drives the rotation of the wheels. Reversal of the handle motion results in reversal of wheel motion as is preferred in typical wheelchair operation. If the user stops imparting input force to the handle while the wheelchair is in motion, any continued wheelchair motion due to momentum will drive the handle along its input path. In alternative, and less preferred embodiments, a coast function may be obtained by introducing a clutch or similar mechanism to disengage the input handle at selected times.

Figure 5A:
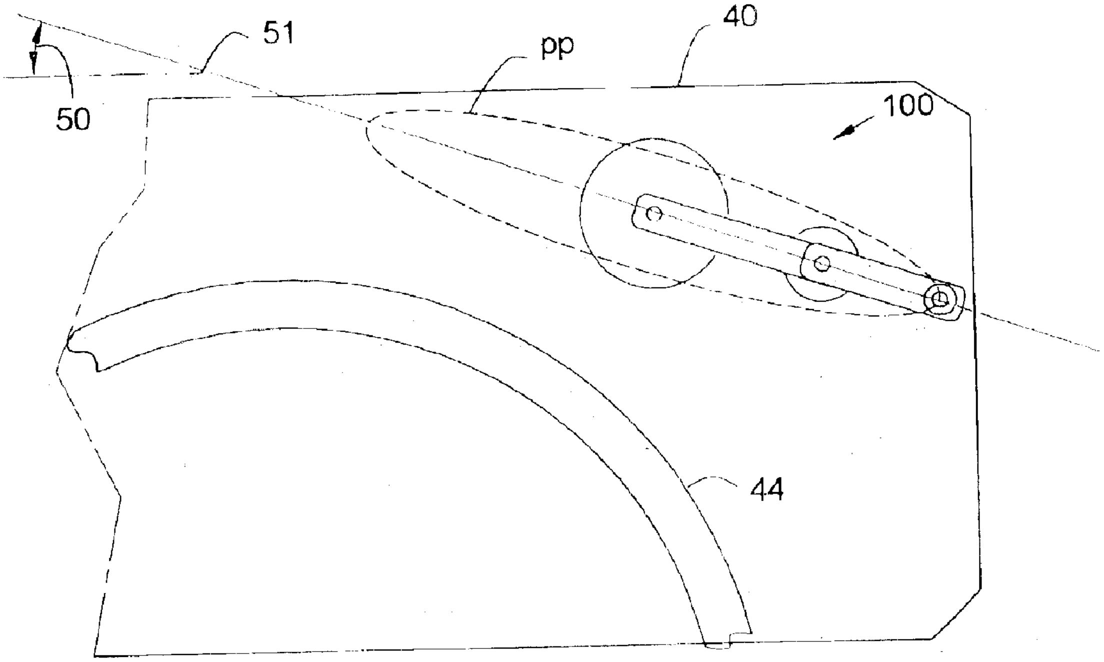
FIGS. 5A and 5B are partial side views of the wheelchair shown in FIG. 4 with a propulsion mechanism at different relative angular orientations.
Figure 5B:
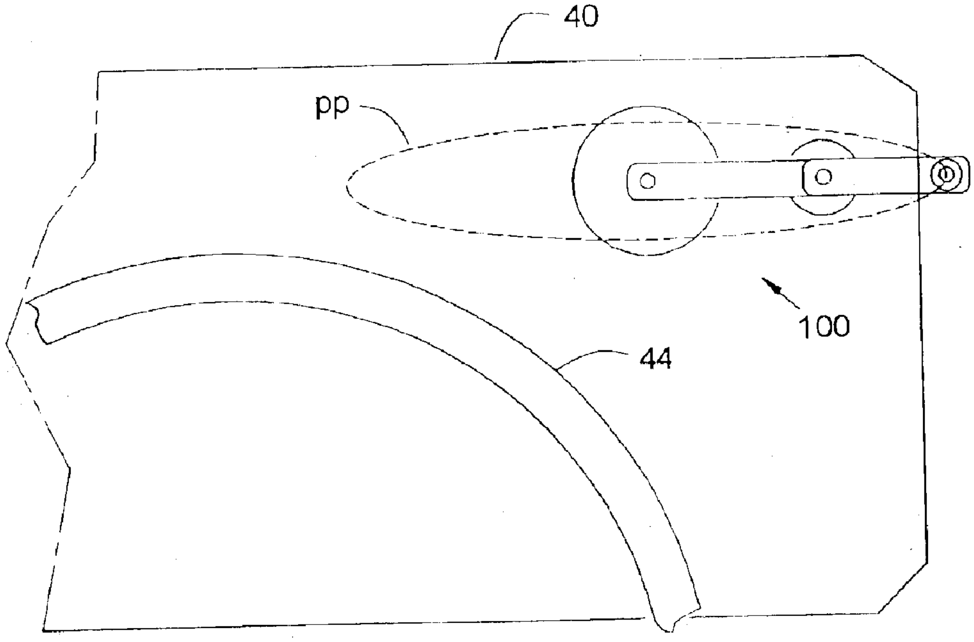

FIGS. 5A and 5B are partial side views of the wheelchair 40 shown in FIG. 4 with the propulsion mechanism 100 at different relative angular orientations. The mechanism may be adjusted to change an input path angle 50 by changing the angular position with respect to the sun gear—at which the input lever is oriented radially outward from the sun gear. The input path angle 50 is the angle between the major axis 51 and the horizontal axis (with respect to the normal attitude of the chair on a traveled surface). In FIG. 5B the input path angle is zero. By changing the input path angle 50, the nature of a user’s muscular exertions used in propulsion may be changed. In inventive methods of use, the propulsive mechanism path angle is adjusted to match particular muscular strengths of a user.

The embodiment and configurations shown in the figures provide a means of either linear or elliptical input motion for propulsion. Alternative constructions providing the same function are contemplated. For example, for simplicity and low cost, a roller chain is used to link the planet and sun gears. Alternatively, an idler gear may be employed to link the planet and sun gears in the same manner. The form of the gears, their teeth and associated roller chains is typical of a variety of standard elements used for similar purposes. Alternative forms, such as toothed fabric belts and matching gears are also contemplated in alternative embodiments.

Prototype propulsion mechanisms were constructed and mounted on a wheelchair to test the effectiveness and efficiency of the propulsive mode provided by the invention. The following Table 1 provides characteristic parameters of the prototype.

TABLE 1

Prototype Mechanical Parameters

| Description | Units | |
|---|---|---|
| Length of orbit lever | 3.15 | inch |
| Length of input lever | 1.5 | inch |
| Planet gear pitch | 12.5 | teeth/in |
| Planet gear pitch diameter | 1.598 | inch |
| Number of planet gear teeth | 20 | teeth |
| Sun gear pitch | 12.6 | teeth/inch |
| Sun gear pitch diameter | 3.187 | inch |
| Number of sun gear teeth | 40 | teeth |
| Drive gear pitch | 8.4 | teeth/inch |

TABLE 1-continued

| Prototype Mechanical Parameters | |
|---|---|
| Description | Units |
| Drive gear pitch diameter | 3.11 inch |
| Number of wheel sprocket teeth | 26 teeth |

The above parameters result in an elliptical input path having a major diameter of 9.3 inches and a minor diameter of 3.3 inches. This form was selected, for test comparison purposes, to approximate a typical input path for a user of a conventional wheelchair using a "rim push" mode of propulsion. However, in the use of conventional wheelchairs in prior "rim push" modes, propulsive power is only delivered during forward motion of the hand. Due to the fact that the inventive mechanism provides continuous drive force throughout the input path, the inventive mechanism is more efficient with respect to a user's hand travel. In addition, the continuous reciprocating motion, requiring both generally pulling and pushing exertion by the user, results in symmetric muscle use and development.

Note that the mechanical advantage of a wheelchair with the inventive propulsion system may be modified by selection of different sizes (pitch diameter or number of teeth) for the drive gear and wheel sprocket. The relative size of these elements defines the relative rotational speed and torque in operation of each. Due to the compact design of the propulsive mechanism generally, and of the individual elements, and the nature of its attachment and connection with the wheelchair, the geometric envelope of the wheelchair is minimally increased. In particular, the side-to-side width of the wheelchair, at the outer edge of the wheels increased by only 2 inches.

A comparative test of the inventive propulsive mechanism and a conventional wheelchair was performed to evaluate the performance of the invention. A number of human able-bodied subjects performed identical timed exercises in both a conventional wheelchair using rim-push propulsion and in a wheelchair including the inventive mechanism. Subjective evaluation of the test subjects discovered no complaints of muscle or joint pain or discomfort due to use of the inventive device. However, shoulder pain typical of wheelchair users was reported during use of the conventional wheelchair with rim-push propulsion.

The preceding discussion is provided for example only. Other variations of the claimed inventive concepts will be obvious to those skilled in the art. Adaptation or incorporation of known alternative devices and materials, present and future is also contemplated. For example, the above description is with respect to one typical design of a wheelchair while it is obvious that the present inventive propulsion mechanism and system may be applied to a great variety of different wheelchair designs to obtain similar benefits. The intended scope of the invention is defined by the following claims.

We claim:

1. A wheelchair comprising:

a wheelchair body:

at least two supporting wheels rotatably secured to the wheelchair body;

at least one propulsion mechanism, each propulsion mechanism comprising:

a sun gear rigidly mounted to the wheelchair body and having a first effective diameter;

a planet gear having a second effective diameter, the second diameter being one half the first effective diameter and the planet gear rotationally linked to the sun gear;

a grippable handle rigidly connected to the planet gear;

a drive gear coaxial with the sun gear and rotatably secured to the wheelchair body and linked to at least one of the wheels: and the planet gear connected to the drive gear;

such that motion of the handle rotates wheels.

2. A wheelchair according to claim 1 and wherein:

the handle has a reciprocating input path.

3. A wheelchair according to claim 2, and wherein:

the reciprocating input path is a straight line.

4. A wheelchair according to claim 2, and wherein:

the reciprocating input path has an elliptical shape.

5. A wheelchair according to claim 4, and further comprising:

an included angle between the elliptical input path major axis and the horizontal axis; the included angle greater than zero degrees.

* * * * *